Aug. 12, 1958     J. Z. DE LOREAN     2,847,093
BRAKE
Filed March 31, 1955
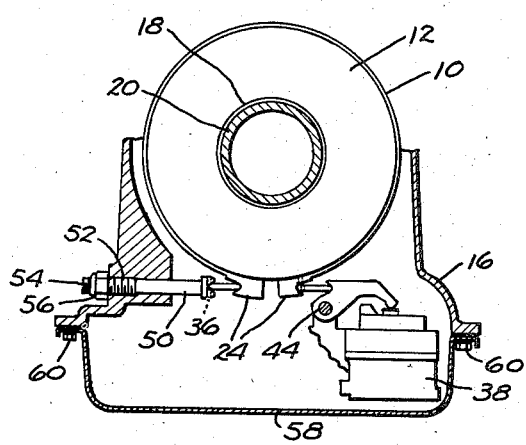
FIG. 1
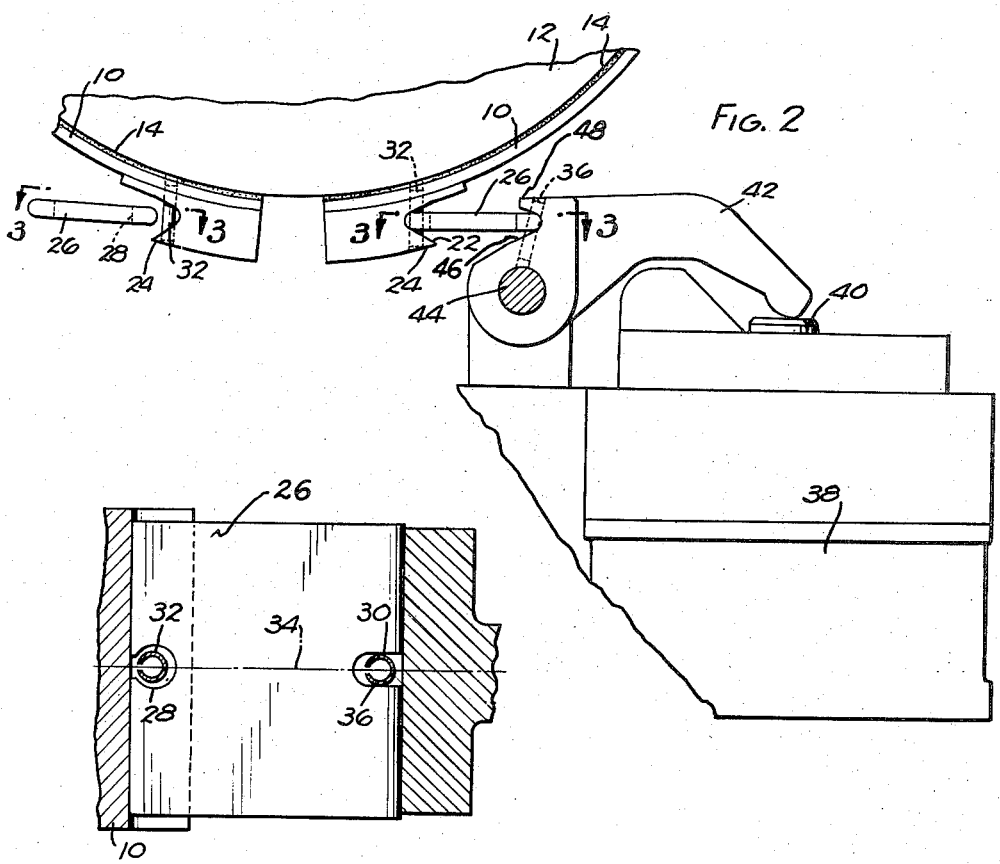
FIG. 2
FIG. 3
INVENTOR.
JOHN Z. DeLOREAN
BY
Wilson, Redrow, and Sadler
ATTORNEYS

United States Patent Office 2,847,093
Patented Aug. 12, 1958

2,847,093

BRAKE

John Z. De Lorean, Detroit, Mich., assignor to Studebaker-Packard Corporation, Detroit, Mich., a corporation of Michigan Application March 31, 1955, Serial No. 498,403

9 Claims. (Cl. 188—77)

The present application relates to a brake and to thrust struts stressed to actuate the same, and more particularly to an improved construction for disengageably fixing a brake band stressing strut against accidental dislocation and withdrawal from a slot formed for the strut in an end of the band.

An object of the invention is the provision of an improved strut and brake band construction comprising a brake band member having a slot in an end thereof for receiving the strut member, with one of the members being provided with a pin transversely disposed with respect to and within the slot and with the other member having a pin receiving notch formed with a reversely flared taper for engaging the pin to hold the strut against unwanted retraction out of the slot. More particularly, it is an object of the invention to provide the pin in the end of the brake band member and to provide the reversely flared notch in the end of the strut member.

The invention disclosed consists of the novel constructions, arrangements, and devices to be hereinafter described and claimed for carrying out the above stated objects and such other objects which either will be specifically pointed out or become apparent from the following written description taken in conjunction with the accompanying drawings in which:

Figure 1 is a transverse end view of a brake drum and a brake band surrounding the drum and embodying the present improved band engaging struts;

Figure 2 is a fragmentary enlargement corresponding to Figure 1 but with one strut being shown out of its normal engagement with an end of the band for illustrative purposes; and Figure 3 is a sectional view taken along both sets of the section lines 3—3 of Figure 2.

In the drawing a brake band 10 is illustrated surrounding a brake drum 12 which is provided with a cylindrical hub. The band 10 may be a metal forging and has affixed to its inner surface a wear surface strip of friction lining 14. The cylindrically hubbed drum 12 is mounted to rotate within a transmission case 16 upon one or more sleeve bearings 18 supported as by means of the hollow tubular end portion of a stationary casting 20 affixed to the case 16. The band and the drum 10, 12 are both substantially cylindrical, the band 10 having substantially 360° of arcuate warp and being adapted to be contracted by bringing its adjacent end portions together to engage the drum for braking and holding the drum stationary for any suitable purpose, as for instance for use in the capacity as reaction member in a planetary gear train type automatic transmission.

The band 10 at each of its opposite adjacent end portions is provided with an end member which defines a transverse slot 22 and which may be formed integral with the end portion of the band or formed as a separate part and affixed thereto as by means of welding. The end member incorporates a backwardly extending tip portion 24 forming a re-entrant angle of engagement with the main outside surface thereof. A strut 26, technically an applying strut on the right and a reaction strut on the left, Figure 1, is provided for each of the slots 22 and has a pair of opposite notches 28, 30 located on the strut center line as roughly indicated at 34. The notch 28 is reversely flared so as to form a restricted chordal opening thereto and receives therethrough the midportion of a pin 32 which is set in an appropriate bore in the ends of the brake band 10 and is secured fast in transverse disposition with the slot 22. An expedient for forming such a reversely flared restricted notch 28 where desired is to punch the strut at a point so close to the edge of its transverse linear end that the resulting punched opening intersects the edge to give much the appearance and effect of a torn opening, notwithstanding the fact that the apparent tear is held to somewhat accurate tolerances to produce a restricted mouth of predetermined width leading into the notch. The pin 32 may be solid but preferably is a hollow spring pin as shown which is comprised of a one-piece springy cylindrical sleeve incorporating a longitudinal split along one entire side to permit the pin to elastically collapse somewhat in its girth dimension. In one physically constructed embodiment of the invention the free diameter of the pin 32 was approximately 0.100" whereas the effective outside diameter of the pin 32 when suitably anchored in its anchoring bore in the ends of the band 10 was 0.094 inch corresponding to the bore diameter and the restricted mouth of the reversely flared notch 28 was 0.085 inch so as to provide a slight interference fit when the pin is squeezed into and out of the restricted end of the slot.

The slot 30 at the opposite end of the strut 26 is of uniform width through the length thereof and receives a hollow spring pin 36 which is of smaller diameter than the width of the slot 30 and which may in fact be of slightly smaller diameter than the hollow spring pin 32. No interference fit is necessary or even desirable between the uniformly wide slot 30 and its companion hollow spring 36 received therein.

The band 10 is tightened about the drum 12 through the application of pressure which stresses the struts 26 so as to bring the ends of the band together. Although the strut 26 on the left hand side of Figure 2 is illustrated as being out of its slot 22, the strut in its effective position of operation of the band 10 is in contact with the bottom of the corresponding slot 22, in disengageable snap engagement with the pin 32 as will be understood. It can be seen from Figure 2 that the struts 26 have rounded extremities in side view and smoothly fit against the apex of the notch 32 having a companion rounded cross section. The struts 26 are each held from movement laterally of the slots 22 in the endwise direction of the latter by means of the pins 32 which afford the previously noted function of preventing accidental dislocation and separation of the struts 26 from their slots 22 in a retractive direction, and which likewise provide for limited rotative movement of the strut 26. In summary, the disengageable engagement of the captive strut by the hollow spring pin 32 restricts freedom of movement of the latter in two directions, namely axially and transversely of the strut axis 34, but permits a limited freedom of movement in a third sense, namely rotatively or tiltingly.

Any suitable pressure applying mechanism may be utilized for stressing the struts 26 in order to contract the band 10 and cause its engagement with the drum 12. The band's own resiliency may be utilized for disengaging the band from the drum 12.

Illustrative of one example of pressure applying mechanism is a fluid pressure actuated servo brake motor 38 having a piston connected piston rod 40 slidably received therein which under the application of internal pressure to the piston-rod piston within the motor 38 is moved upwardly to engage a band applying lever 42 mounted to rock about a shaft 44 made axially fast to the case 16. An expedient for rendering the shaft 44 axially fast to the case is to provide an annular groove at a point in the girth of the shaft between its ends, and insert the adjacent lower end of the pin 36 thereinto to pin the shaft in place. The lever 42 is provided with a strut receiving notch 46 having a backwardly extending tip portion 48 forming a re-entrant angle of engagement with the body portion of the link 42. The hollow spring pin 36 received in the uniformly wide strut notch 30 is anchored within a receiving bore disposed in the servo lever 42 so as to render the pin 36 transverse to but within the notch 46. The opposite strut 26, shown out of position in Figure 2, is provided with a similar end slot receiving a corresponding pin 36 mounted in an adjacent brake band anchor 50 secured as by means of a threaded portion 52 thereon to an internally threaded receiving bore in the case 16. A tool receiving slot indicated at 54 at the outer end of the threaded portion 52 is useful as a means for adjusting the anchor 50 in its axial direction so as to properly adjust the brake band 10. A lock nut 56 about the threaded portion 52 of the anchor provides for locking the anchor 50 in its adjusted position. The transmission case 16 may be closed at the bottom by an oil pan 58 provided with a plurality of threaded fasteners 60 for bolting the same in place to a portion, preferably a flange, on the underside of the transmission case 16.

As herein disclosed the struts are shown to have a reversely flared notch at one end and a notch of uniform width at the opposite end but indeed it is not essential that a uniformly wide notch be used at all and actually both ends may be provided with a reversely flared pin retaining notch. So also the drawing shows that the restricted notch is so located on the strut that the brake band is the parent member to which the strut is always primarily attached but it is evident that the parent member to which the strut 26 is effectively attached against dislocation may equally well be the actuating lever 42 or the anchor member 50 as the case may be and effectuated merely be reversing the strut end for end. In any case the strut 26 actually affixes itself to a parent member such that it will not be accidentally dislocated and dropped into the transmission case 16 inadvertently during assembly so as to descend into and have to be retrieved from the oil pan 58.

Variations within the spirit and scope of the invention described are equally comprehended by the foregoing description.

What is claimed is:

1. In a brake, the combination of a brake band having two ends adapted to be stressed for changing the diameter of the band to apply it to a drum, one of said ends having a slot formed therein, a strut fitting in said slot for stressing the band, and expansible connector means for limiting freedom of movement of the strut in two directions from the slot in the end of the band, and including a notch formed with a restriction in one and a member fast to the other of said strut and band with the member fitting in the notch and restrained by the restriction, said strut and band including contacting surfaces disposed one on each side of the interfitting member and notch for applying stress through the contacting surfaces between the strut and the band.

2. In a brake, the combination of a brake band having two ends and adapted to have force applied to the ends for changing the diameter of the band, one of said ends having a slot formed therein, a strut fitting in said slot for stressing the band, and expansible connector means for limiting freedom of movement of the strut in two directions out of the slot in the end of the band, and including a notch formed with a restriction in the strut and a pin member fast to the slotted end of the band with the pin member passing through the notch, said strut and band including contacting surfaces disposed one on each side of the interfitting pin member and notch for applying force through the contacting surfaces between the strut and the band.

3. In a brake, the combination of a substantially cylindrical brake band having one end formed with a slot therein extending axially of the band, and a strut having a transverse linear end fitting in and extending for a major portion of the length of said slot for stressing the end of the band, said strut at that end being provided with a reversely flared notch having the restriction thereof intersecting said linear end adjacent the slot, said band being provided with a hollow spring pin affixed thereto with the midportion of the pin passing through said notch and engaging the restriction for elastically restraining the strut against retractive movement out of the slot.

4. In a brake, the combination of a brake band having two ends, each of said ends having a slot formed therein, a strut engaged with a stationary part and received in the slot in one of said ends for providing a reaction force for the brake band, a second strut engaged with a force applying part and received in the slot in the other said ends for applying a force to the band for applying it to a drum, each of said ends of the band having a transverse pin provided across its slot intermediate the ends thereof, and a reversely flared notch formed in each of the struts intermediate the sides thereof and having its restriction projecting into the respective slots and about the pins in interference fits so as to prevent dislocation of the struts from the ends of the band.

5. In a brake, the combination of a brake band having two ends, each of said ends being slotted, a strut fitted to a similarly slotted stationary part and fitting into the slot in one of said ends for providing a reaction force for the brake band, a second strut fitted to a slotted force applying part and fitting into the slot in the other said ends for applying a force to the band to engage a drum, each of said ends of the band and each of said slotted parts having a transverse pin provided across its slot intermediate the ends thereof, and a notch formed in each of the ends of the struts intermediate the sides thereof and having its sides projecting into the respective slots about the pins, at least one notch on each strut having a restricted pin engaging mouth so as to prevent withdrawal of the strut from the front of the slot in which it is fitted.

6. In a brake, the combination of a brake band having adjacent end parts which when brought toward and from one another cause the band to contract and expand, each of said end parts having a slot formed therein extending axially of the band, a first strut engaging a stationary part and having a transverse linear end fitting into and extending for a major portion of the length of the slot in one of said ends for providing a reaction force to the band, a second strut engaging a force applying part and having a transverse linear end fitting into and extending for a major portion of the length of the slot in the other of said ends for changing the degree of contraction of the band and applying it to a drum, one of the ends of each of said first and second struts having an opening formed therein which intersects the extreme edge of the end to produce a torn opening restricted at the tear, and a hollow spring pin received in the opening and anchored in the appropriate adjacent part aforesaid so as to be elastically collapsible in girth to permit forced withdrawal of the strut relative to the pin through the restriction at the side of the opening.

7. In a brake, the combination of a brake band having adjacent end parts which are brought toward one another to actuate the band to cause it to contract, each of said end parts having a slot formed therein extending axially of the band, a strut affixed to a stationary part and having a transverse linear end fitting into and extending for a major portion of the length of the slot in one of said ends for providing a reaction force to the band, a strut affixed to a force applying part and having a transverse linear end fitting into and extending for a major portion of the length of the slot in the other of said ends for contracting the band and applying it to a drum, each of the band engaging ends of the struts having an opening formed therein which intersects the extreme edge of that end to produce a torn opening restricted at the tear, and a hollow spring pin received in the opening and anchored in the appropriate adjacent band end part aforesaid so as to be elastically collapsible to permit forced withdrawal of the strut relative to the pin through the restriction at the side of the opening.

8. In a brake, the combination of a brake band having adjacent end parts which can be brought toward one another to cause the band to contract, each of said end parts having a slot formed therein extending axially of the band, a strut connected to a stationary part and having a transverse linear end fitting into and extending for a major portion of the length of the slot in one of said ends for providing a reaction force to the band, and a strut connected to a force applying part and having a transverse linear end fitting into and extending for a major portion of the length of the slot in the other of said ends for changing the relative contraction of the band and applying it to a drum, said struts having at one end a notch of nonuniform width and a radially expansible connector about which the notch can be forcibly fit and passing transversely across said slot in the adjacent part.

9. In a brake, the combination of a brake band having adjacent end parts which can be brought toward one another to cause the band to contract, each of said end parts having a slot formed therein extending axially of the band, a strut between a similarly slotted stationary part and one of said end parts and having a transverse linear end fitting into and extending for a major portion of the length of one of said slots for providing a reaction force transmitted to the band, a strut between a slotted force applying part and the other of said slotted end parts and having a transverse linear end fitting into and extending for a major portion of the length of one of the slots for transmitting force to change the contraction of the band for applying it to a drum, the different ends of each of the struts having notches of nonuniform and uniform widths respectively and a pin about which each notch can be passed in a position passing transversely across said slot in the adjacent part.

References Cited in the file of this patent

UNITED STATES PATENTS

| | | |
|---|---|---|
| 2,087,958 | Allen | July 27, 1937 |
| 2,182,386 | Patterson | Dec. 5, 1939 |
| 2,536,856 | Roeder | Jan. 2, 1951 |
| 2,637,420 | Churchill | May 5, 1953 |
| 2,678,703 | Williams | May 18, 1954 |
| 2,692,663 | Reed | Oct. 26, 1954 |
| 2,778,470 | Goldberg | Jan. 22, 1957 |

FOREIGN PATENTS

| | | |
|---|---|---|
| 672,474 | Great Britain | May 21, 1952 |

OTHER REFERENCES

Sheet Metal Worker, November 1947, page 61.